(12) United States Patent
Hu

(10) Patent No.: US 7,895,759 B2
(45) Date of Patent: Mar. 1, 2011

(54) ELECTRONIC DEVICE AND METHOD FOR INDICATING DIRECTION IN ELECTRONIC DEVICE

(75) Inventor: Zu-Hong Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/609,205

(22) Filed: Oct. 30, 2009

(65) Prior Publication Data

US 2010/0313434 A1     Dec. 16, 2010

(30) Foreign Application Priority Data

Jun. 12, 2009   (CN) .......................... 2009 1 0303210

(51) Int. Cl.
*G01C 17/28*   (2006.01)
*H01L 43/08*   (2006.01)
(52) U.S. Cl. ......................................... 33/361; 338/32 R
(58) Field of Classification Search ................ 33/355 R, 33/361; 338/13, 32 R, 68, 118, 160
See application file for complete search history.

(56) References Cited

U.S. PATENT DOCUMENTS

| | | | | | |
|---|---|---|---|---|---|
| 3,581,264 | A | * | 5/1971 | Person | 338/32 R |
| 4,288,927 | A | * | 9/1981 | Stockton | 33/355 R |
| 4,801,830 | A | * | 1/1989 | Ogino et al. | 338/32 R |
| 5,399,981 | A | * | 3/1995 | Vermesse | 33/1 PT |
| 5,755,036 | A | * | 5/1998 | Lewis | 33/355 R |
| 6,154,025 | A | * | 11/2000 | Schelter et al. | 338/32 R |
| 6,714,374 | B1 | * | 3/2004 | Hayashi et al. | 338/32 R |
| 6,826,843 | B2 | * | 12/2004 | Lam et al. | 33/355 R |
| 2010/0095878 | A1 | * | 4/2010 | Kilgus | 33/355 R |
| 2010/0199506 | A1 | * | 8/2010 | Moureaux et al. | 33/361 |

* cited by examiner

*Primary Examiner* — G. Bradley Bennett
(74) *Attorney, Agent, or Firm* — D. Austin Bonderer

(57) ABSTRACT

An electronic device includes resistor, a pointer, a measuring module, a calculating module, and a display module. The resistor has a reference point corresponding with a reference direction. The resistor defines a circle. The pointer has a pointing terminal contacting the resistor at a contacting point corresponding with a reference direction. The pointer is pivotably mounted about a centre of the circle. The pointer is aligned with the magnetic field of the Earth, and the measuring module measures the voltage between the contacting point and the reference point. The calculating module calculates an angle between the current direction and the reference direction according to the voltage between the contacting point and the reference point of the resistor. The display module displays corresponding direction information according to the angle.

12 Claims, 4 Drawing Sheets

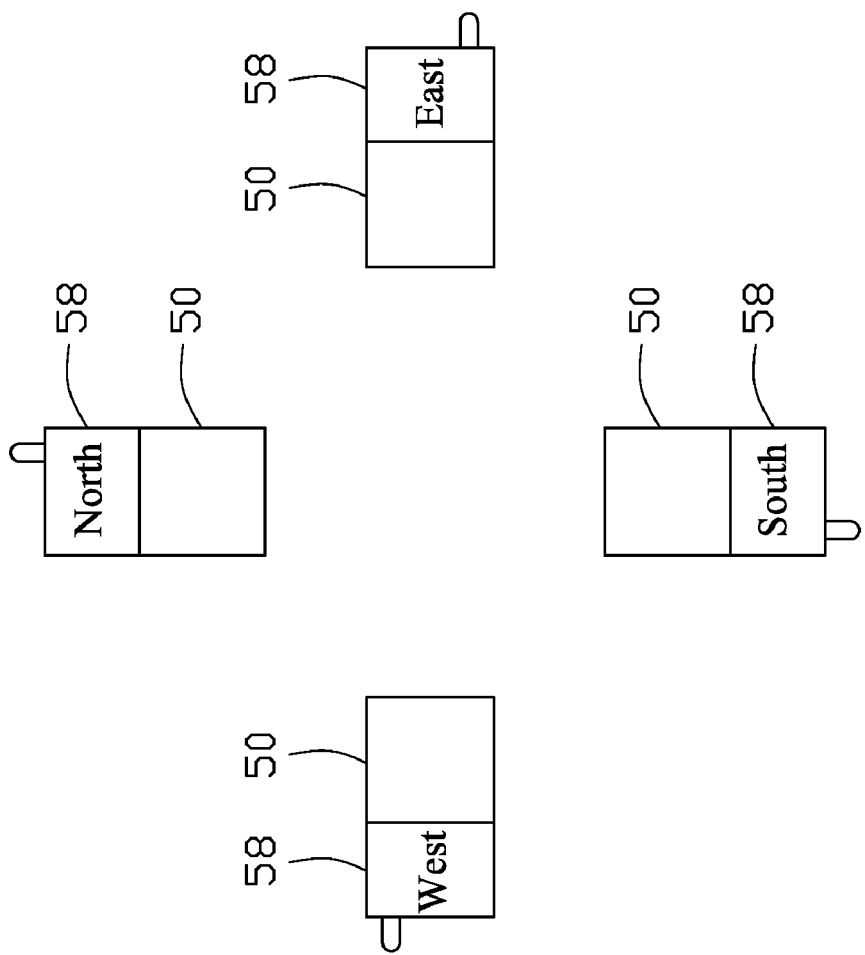

ELECTRONIC DEVICE AND METHOD FOR INDICATING DIRECTION IN ELECTRONIC DEVICE

BACKGROUND

1. Technical Field

The disclosure generally relates to electronic devices, especially to an electronic device and method for indicating direction.

2. Description of Related Art

Compasses are often used to determine direction relative to the Earth's magnetic poles. A typical compass usually consists of a magnetized pointer free to pivot until aligned with the magnetic field of Earth. People use compasses to indicate directions for them. While people usually take mobile terminals, portable digital assistants (PDAs) or some other electronic devices, they typically do not carry compasses.

BRIEF DESCRIPTION OF THE DRAWINGS

FIG. 4 is a schematic view of the electronic device in different directions.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
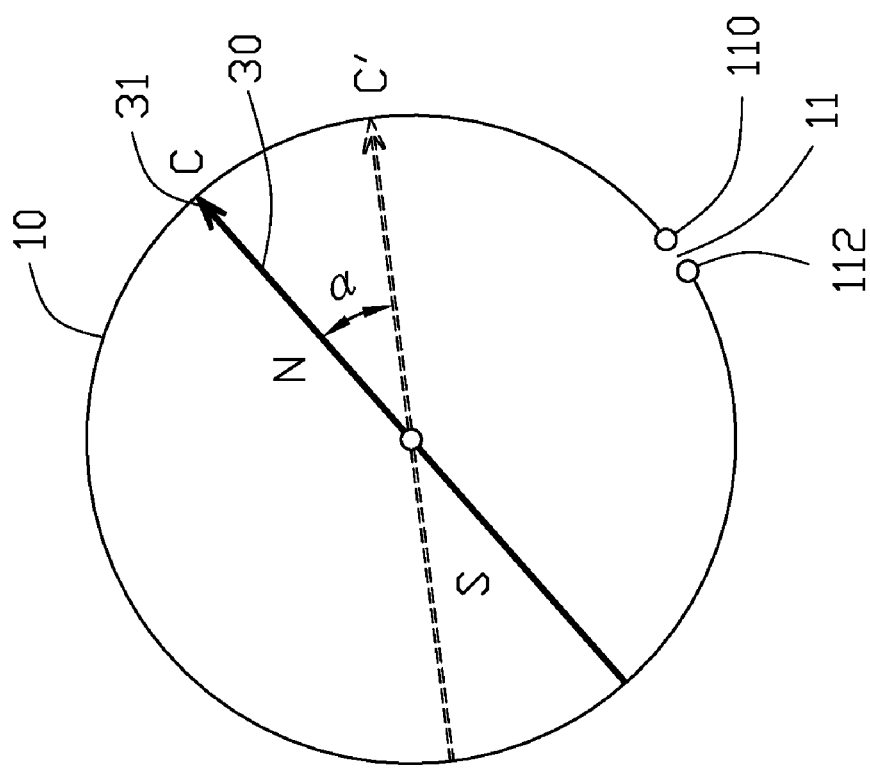
FIG. 1 is a schematic view of a resistor and a magnetic needle in an electronic device.
Figure 2:
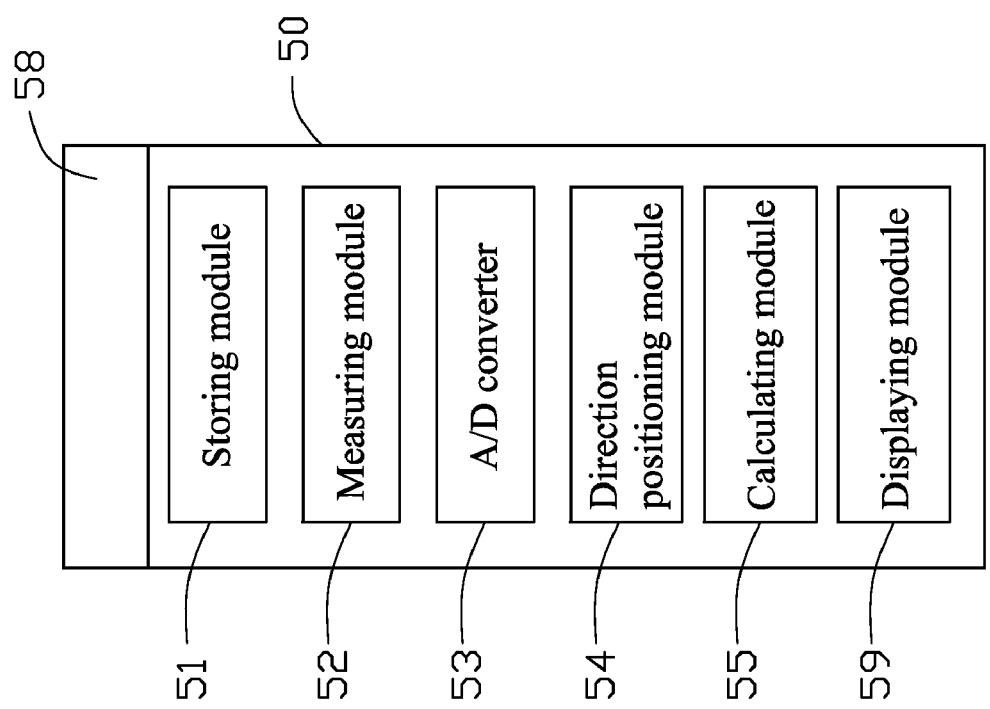
FIG. 2 is a block diagram of the electronic device.

Referring to FIGS. 1 and 2, an electronic device includes a ring-shaped resistor 10, and a pointer 30 suspended in a centre and free to pivot about the centre of the resistor 10. The pointer 30 is aligned with the magnetic field of Earth. In this embodiment, the electronic device is a mobile terminal 50, and the pointer 30 is a magnetized needle.

The resistor 10 includes a first terminal 110 and a second terminal 112. The first terminal 110 is configured to be connected to a supply voltage Vcc, and the second terminal 112 is configured to be connected to ground. The resistor 10 has symmetrical scale intervals thereon. A gap 11 is defined between the first and second terminals 110, 112.

The pointer 30 includes a pointing terminal 31 for contacting the resistor 10. The resistor 10 forms a circle therein. The pointer 30 is pivotably mounted about a centre of the circle of the resistor 10.

A reference point C of the resistor 10 is defined as an initializing point corresponding with a reference direction. A contacting point C' of the resistor 10 is defined as a current point corresponding with a current direction. In one embodiment, the reference direction is south direction.

Referring to FIG. 2, the mobile terminal 50 includes a storing module 51, a measuring module 52, an A/D converter 53, a direction positioning module 54, a calculating module 55, a front portion 58, and a display module 59.

The storing module 51 is configured to pre-store direction information corresponding with the angles between the current direction and the reference direction respectively. For example, when the reference direction is south, the southeast, east, northeast, north, northwest, west, southwest corresponds with the angle 45°, 90°, 135°, 180°, 225°, 270°, 315° respectively. The front portion 58 is a pointing portion of a current direction.

The measuring module 52 is configured to measure the current voltage V' between the contacting point C' and the reference point C of the resistor 10.

The A/D converter 53 is configured to convert the current voltage V' measured by the voltage measure module 52 to a digital voltage value V".

The calculating module 55 is configured to calculate an angle $\alpha$ between the current direction and the reference direction. For example, the whole voltage between the first and second terminals 110, 112 of the resistor 10 is Vcc, the current voltage between the contacting point C and the reference point C is V'. The angle $\alpha$ is determined according to $\alpha = 360° * V'/Vcc$. Therefore, the angle $\alpha$ is easily acquired according to calculation.

The direction positioning module 54 is configured to select corresponding direction information from the storing module 51 according to the angle acquired by the calculating module 55.

Figure 3:
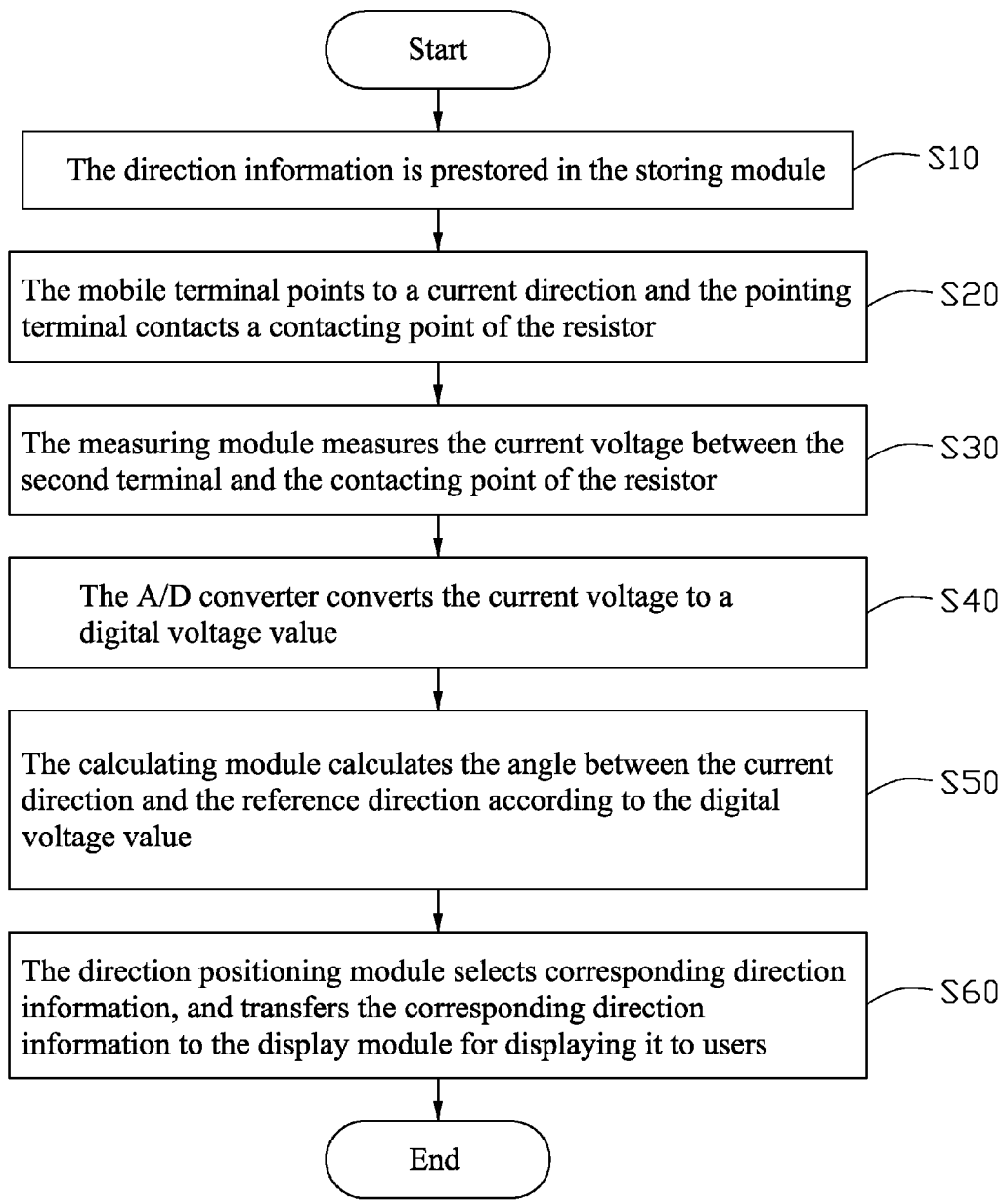
FIG. 3 is a flowchart of a method for indicating direction in the electronic device.

Referring to FIGS. 3 and 4, the positioning direction method of an embodiment includes the following steps.

In step S10, the direction information corresponding with the angle between the current direction of the pointer 30 and the south direction is pre-stored in the storing module 51 of the mobile terminal 50.

In step S20, the mobile terminal 50 is placed in a horizontal orientation and the pointing portion of the mobile terminal 50 points to a current direction and the pointing terminal 31 of the pointer 30 contacts a contacting point C' of the resistor 10.

In step S30, the measuring module 52 measures the current voltage V' between the second terminal and the contacting point C' of the resistor 10 when the pointing portion of the mobile terminal 50 points to the current direction.

In step S40, the A/D converter 53 of the mobile terminal 50 converts the current voltage V' to a digital voltage value V".

In step S50, the calculating module 55 calculates the angle $\alpha$ between the current direction and the reference direction according to the digital voltage value V".

In step S60, the direction positioning module 54 selects corresponding direction information from the storing module 51 according to the angle $\alpha$ acquired by the calculating module 55, and transfers the corresponding direction information to the display module 59 for displaying the corresponding direction information to users.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device, comprising:
   a resistor comprising a first terminal, configured to be connected to a supply voltage, and a second terminal, configured to be connected to ground; the resistor defines a circle; the resistor has a reference point corresponding with a reference direction;
   a pointer pivotablely mounted about a centre of the circle, the pointer having a pointing terminal having contact with the resistor at a contacting point corresponding with a current direction, and the pointer is aligned with the magnetic field of the Earth;
   a measuring module configured to measure a voltage between the contacting point and the reference point;
   a calculating module configured to calculate an angle between the current direction and the reference direction according to the voltage between the contacting point and the reference point of the resistor; and
   a display module configured to display corresponding direction information according to the angle.

2. The electronic device of the claim 1, further comprising a storing module and a direction indicating module; the storing module is configured to pre-store direction information corresponding with angles; and the direction indicating module is configured to select direction information stored in the storing module according to the angle acquired by the calculating module and transfer the direction information to the display module.

3. The electronic device of the claim 1, wherein the reference direction is south direction.

4. The electronic device of the claim 1, wherein the supply voltage is Vcc, and the current voltage between the contacting point and the reference point is V'; and the angle is equal to 360°*V'/Vcc.

5. The electronic device of the claim 1, wherein the pointer is a magnetized needle.

6. The electronic device of the claim 1, further comprising an A/D converter configured to transfer the current voltage to a digital voltage value.

7. A method, the method comprising:
   providing an electronic device, the electronic device comprising:
      a ring-shaped resistor having a first terminal configured to be connected to a supply voltage, and a second terminal configured to be connected to ground; the resistor forms a circle; the resistor has a reference point corresponding with a reference direction; and
      a centre of the circle, the pointer having a pointing terminal having contact with the resistor at a contacting point corresponding with a current direction, and the pointer is aligned with the magnetic field of Earth;
   measuring the voltage between the contacting point and the reference point of the resistor;
   calculating an angle between the current direction and the reference direction according to the voltage between the contacting point and the reference point of the resistor; and
   displaying corresponding direction information according to the angle.

8. The method of the claim 7, wherein the method further comprising pre-storing direction information corresponding with angles, and select direction information according to the angle and transfer the direction information to display.

9. The method of the claim 7, wherein the reference direction is south direction.

10. The method of the claim 7, wherein the supply voltage is Vcc, and the current voltage between the contacting point and the reference point is V', and the angle is equal to 360°*V'/Vcc.

11. The method of the claim 7, wherein the pointer is a magnetized needle.

12. The method of the claim 7 further comprising transferring the current voltage to a digital voltage value before calculating the angle between the contacting point and the reference point of the resistor.

* * * * *